United States Patent

Hoffman

[15] 3,663,835

[45] May 16, 1972

[54] FIELD EFFECT TRANSISTOR CIRCUIT

[72] Inventor: William K. Hoffman, Shelburne, Vt.

[73] Assignee: International Business Machines Corporation, Armonk, N.Y.

[22] Filed: Jan. 28, 1970

[21] Appl. No.: 6,495

[52] U.S. Cl. ..............................307/246, 307/251, 307/279

[51] Int. Cl. ..............................H03k 17/00

[58] Field of Search .............307/205, 221 C, 238, 246, 247, 307/351, 304, 303, 279

[56] References Cited

UNITED STATES PATENTS

| | | | |
|---|---|---|---|
| 3,252,009 | 5/1966 | Weimer | 307/221 C |
| 3,322,974 | 5/1967 | Ahrons et al. | 307/279 |
| 3,524,077 | 8/1970 | Kaufman | 307/246 |
| 3,397,353 | 8/1968 | Hitt et al. | 307/251 |
| 3,383,570 | 5/1968 | Luscher | 307/279 |
| 3,513,365 | 5/1970 | Levi | 307/251 |
| 3,506,851 | 4/1970 | Polkinghorn | 307/251 |
| 3,363,115 | 1/1968 | Stephenson et al. | 307/279 |
| 3,286,189 | 11/1966 | Mitchell et al. | 307/251 |
| 3,521,081 | 7/1970 | Vasseur et al. | 307/251 |

OTHER PUBLICATIONS

Sidorsky " Application Notes of General Instrument Corp." Dec. 1967 p. 167

Kerins " Low Power Circuit Design Using P-Channel MOS" Advances in Mos Technology Session 4B Paper 4B.2 Pages 186- 187 3- 22- 70

*Primary Examiner*—John S. Heyman
*Assistant Examiner*—R. E. Hart
*Attorney*—Hanifin and Jancin and Willis E. Higgins

[57] ABSTRACT

A circuit has a field effect transistor (FET) with source, drain and gate electrodes, and a capacitor connecting the source and gate electrode. Means is provided for applying a sufficient pulse to the source electrode and through the capacitor to the gate electrode to give an output signal at the drain electrode independent of any signal information which may be stored on the gate electrode.

7 Claims, 3 Drawing Figures

INVENTOR
WILLIAM K. HOFFMAN

BY Willis E. Higgins
ATTORNEY

FIELD EFFECT TRANSISTOR CIRCUIT

CROSS REFERENCE TO RELATED APPLICATIONS

A co-pending, commonly assigned application Ser. No. 6,496 by William K. Hoffman, entitled "Storage Circuit for Shift Register," filed on the same day as the present application, and a co-pending, commonly assigned application Ser. No. 6,497 by William K. Hoffman and John W. Sumilas, entitled "Modified Storage Circuit for Shift Register," also filed on the same day as the present application, cover circuits for shift registers and shift registers which may utilize the present invention.

FIELD OF THE INVENTION

This invention relates to a new type of FET circuit. More particularly, it relates to an FET circuit in which an output pulse may be obtained at the drain of the FET in response to an input pulse at the source of the FET, independent of the presence or absence of a separate signal applied to the gate of the FET.

There are some situations in which it would be desirable to obtain an output pulse at the drain of an FET in response to an input pulse to the source of the FET, independent of the presence or absence of a separate signal applied to the gate of the FET. For example, in some applications, it is desired both to charge a capacitor through an FET by a pulse, then discharge or not discharge this capacitor through the same FET after termination of the pulse depending on the presence or absence of a separate signal at the gate electrode of the FET. Conventional FET circuits have not been able to carry out these functions with the use of a single FET.

SUMMARY OF THE INVENTION

Accordingly, it is an object of the invention to provide a circuit for producing an output pulse at a drain of an FET, independent of the presence or absence of a separate signal at the gate of the FET, in response to a pulse applied at a source of the FET.

It is a further object of the invention to provide an FET circuit for applying a charge to a capacitor, independent of the presence or absence of a separate signal at the gate of the FET, in response to a pulse applied at the source of the FET, then discharge or not discharge the capacitor through the same FET depending on the presence of a separate signal at its gate.

It is another object of the invention to provide an FET circuit in which a potential at a gate of the FET is caused to change in response to a potential change at a source of the FET, but which does not allow direct current flow from the gate to the source of the FET.

The attainment of these and related objects is achieved in an FET circuit having a capacitor connecting a gate and source electrode of an FET. Means is provided for applying a sufficient pulse to the source electrode of the FET and through the capacitor to its gate to give an output pulse at a drain electrode of the FET. Such an output pulse may be obtained in the absence of any additional input signal to the gate of the FET.

The unique method of operation of the circuit of the present invention is particularly valuable for charging a capacitor connected to the drain of the FET, then discharging or not discharging the capacitor through the same FET, depending on the presence or absence of a control signal at the gate of the FET. However, this unique method of operating an FET should be of substantial value in a wide variety of other circuit applications as well.

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
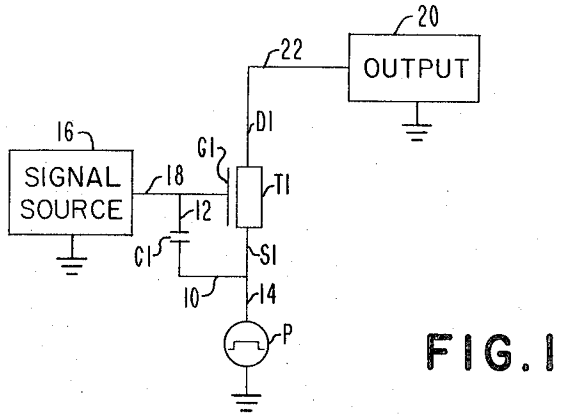
FIG. 1 is a schematic diagram of a circuit in accordance with the invention.

Turning now to the drawings, more particularly to FIG. 1, there is shown a circuit in accordance with the invention. In the following discussion, all FET's are assumed to be of the N-channel type. P-channel FET's may be employed, in which case the positive polarity of signals applied to the gates of the FET's in the following discussion must be reversed. It is further assumed that the circuit is operated with a negative substrate bias, causing the FET's to operate in the enhancement mode. FET T1 has source electrode S1, drain electrode D1, and gate electrode G1. Capacitor C1 has its electrode 10 connected to source electrode S1 of FET T1 and its electrode 12 connected to gate electrode G1 of FET T1. Pulse source P is connected to source electrode S1 by line 14 and, through capacitor C1, to gate electrode G1 of FET T1. Signal source 16 is connected to gate electrode G1 of FET T1 by line 18. A suitable output circuit or load 20 is connected to drain electrode D1 of FET T1 by line 22.

In operation, a pulse from source P to be supplied to output 20 is applied to source electrode S1 of FET T1. By capacitive coupling, this pulse is also applied to gate electrode G1 of FET T1. To provide an output pulse at drain electrode D1 of FET T1, the pulse from source P must be of sufficient magnitude to exceed the threshold of FET T1, thus turning it on and transmitting the pulse through the FET to output 20.

Figure 2:
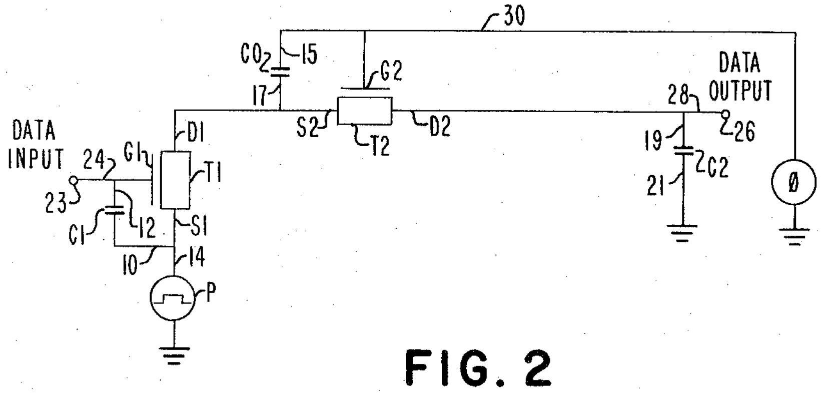
FIG. 2 is a schematic diagram of a single shift register storage cell utilizing the invention.

FIG. 2 shows a single storage circuit of a shift register which utilizes the present invention. As in FIG. 1, the circuit has an FET T1 having source electrode S1, drain electrode D1, and gate electrode G1. Capacitor C1 has its electrode 10 connected to source electrode S1, and its electrode 12 connected to gate electrode G1. Pulse source P is connected to source electrode S1 by line 14. A second FET T2 has its source electrode S2 connected to drain electrode D1 of FET T1. Capacitor C0 has its electrode 15 connected to gate electrode G2 of FET T2, and its electrode 17 connected to source electrode S2 of FET T2. Drain electrode D2 of FET T2 is connected to electrode 19 of capacitor C2, electrode 21 of C2 being connected to ground. Data input terminal 23 is connected to gate electrode G1 of FET T1 by line 24, and data output terminal 26 is connected to electrode 19 of capacitor C2 by line 28. Clocking pulse source $\phi$ is connected to gate electrode G2 of FET T2 by line 30. FET T2 serves as a switch between FET T1 and capacitor C2.

Capacitor C2 serves as a storage capacitor at the output of the circuit. Capacitor C1 serves both as a storage capacitor in the circuit shown and as a coupling means for supplying the AC component of a signal applied to electrode S1 of FET T1 to gate electrode G1 as well, thus turning FET T1 on in the absence of a data charge on storage capacitor C1. Pulse source P supplies pulses for charging storage capacitor C2 through FET's T1 and T2. In operation, a pulse from source P is supplied to source electrode S1 of FET T1 and, by capacitive coupling through capacitor C1, to gate electrode G1 of FET T1. FET T1 is therefore turned on if a charge from the storage capacitor C1 is not already present on gate electrode G1 of FET T1, allowing the pulse to be transmitted to drain electrode D1. If a charge from the storage capacitor C1 is present on gate electrode G1 of FET T1, it is already turned on, and the pulse from source P is simply transmitted through FET T1. Capacitor C0 serves to store the pulse from source P temporarily, if the pulse from source P and a clocking pulse from clocking pulse source $\phi$ do not overlap.

The clocking pulse from source $\phi$ applied to gate G2 of FET T2 turns FET T2 on and provides additional charge to capacitor C0. If no data charge is applied from storage capacitor C1 to gate G1 of FET T1, the charge on capacitor C0 is supplied through the conductive FET T2 to storage capacitor C2. If a data charge is applied to gate G1 of FET T1 from storage capacitor C1, indicating the presence of a data bit "1" at gate electrode G1, FET T1 is turned on, allowing the charge on capacitor C0 to drain away through FET T1 to ground, and further allowing any charge present on storage capacitor C2 to drain away to ground through the conductive FET T2 and FET T1.

It should be apparent that the circuit of FIG. 2 operates as an inverter. Data present at gate electrode G1 of FET T1 from storage capacitor C1 is stored in inverted form on storage capacitor C2. The operation of the circuit of FIG. 2 in a shift register is more fully explained in the above referenced co-pending application by William K. Hoffman, the disclosure of which is incorporated herein by reference.

If the pulses from source P and clocking pulses from clocking pulse source $\phi$ overlap, capacitor C0 may be eliminated from the circuit of FIG. 2, since it is then not necessary to store the pulses from source P temporarily there. A circuit of this type and its operation in a shift register is explained in detail in the above referenced co-pending application by William K. Hoffman and John W. Sumilas, the disclosure of which is also incorporated by reference herein.

Figure 3:
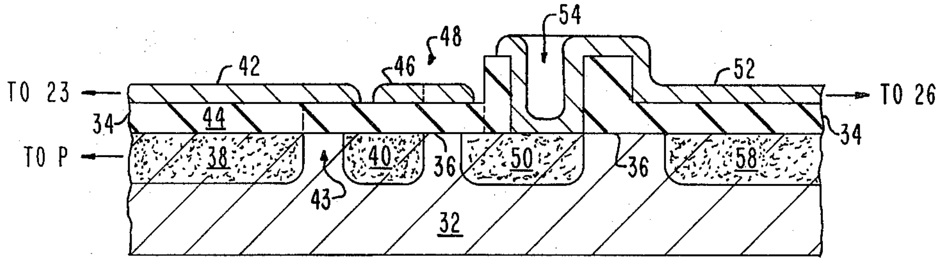
FIG. 3 is a cross section of an integrated circuit embodiment of the circuit shown in FIG. 2.

FIG. 3 shows the circuit of FIG. 2 in integrated form. There is shown a semiconductor substrate 32 having an insulation layer 34 on its surface 36. Source and drain electrodes S1 and D1 of FET T1 of FIG. 2 are formed by diffusions 38 and 40, respectively. Gate electrode G1 of FET T1 is formed by metallization layer 42 overlying channel region 43 between diffusions 38 and 40 in substrate 32. Electrode 12 of capacitor C1 is also formed by metallization layer 42. The other electrode 10 of capacitor C1 comprises the diffusion 38. A portion 44 of oxide layer 34 between metallization layer 42 and diffusion 38 forms the dielectric of the capacitor C1. Metallization layer 42 is connected to the input terminal 23, and diffusion 38 is connected to pulse source P.

In addition to forming drain electrode D1 of FET T1, diffusion 40 also forms the source electrode S2 of FET T2 and electrode 17 of capacitor C0. The other electrode 15 of capacitor C0 is formed by the portion 46 of metallization line 48 which overlies diffusion 40. Metallization line 48 also forms the gate electrode G2 of FET T2. Diffusion 50 forms the drain electrode D2 of FET T2.

Electrode 19 of storage capacitor C2 is formed by metallization pattern 52, which is connected to diffusion 50 by contact 54. The other electrode 21 of capacitor C2 is formed by diffusion 58. Metallization pattern 52 forms data output terminal 26 at its other end (not shown).

The integrated circuit of FIG. 3 may be formed by processes known in the art. For example, the process for making FET integrated circuits disclosed in commonly assigned Couture et al, application Ser. No. 791,214, filed Jan. 15, 1969, now U.S. Pat. No. 3,586,554, the disclosure of which is incorporated herein by reference, may be employed.

It should now be apparent that a circuit capable of attaining the stated objects of the invention has been provided. The circuit, employing a single active device, will produce an output pulse at a drain of an FET, independent of the presence or absence of a separate signal at the gate of the FET, upon the application of a pulse applied directly to a source of the FET and through a capacitor to the gate of the FET.

Such a circuit allows, e.g., a capacitor connected to the drain of the FET to be charged through the FET, then discharged through the same FET or not discharged, depending on the presence or absence of a separate signal at the gate of the FET. The circuit further does not allow current flow from such a separate signal at the gate of the FET to the source of the FET. As a result of being operated in this way, the circuit having a single FET may be used for both charging, then discharging or not discharging a capacitor, functions which have hitherto required at least two separate FET's.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit comprising a field effect transistor with a given threshold voltage and having two current flow electrodes and a gate electrode, a capacitor connecting one of the current flow electrodes and the gate electrode, and a means for applying a sufficient pulse to the current flow electrode to which said capacitor is connected and to the gate electrode through said capacitor to exceed the threshold voltage of the transistor and give an output pulse at the other current flow electrode, independent of a signal at the gate electrode.

2. The circuit of claim 1 additionally comprising a signal source coupled to the gate electrode of said field effect transistor.

3. The circuit of claim 1 in which said field effect transistor is an insulated gate field effect transistor.

4. The circuit of claim 3 in which an electrode of said capacitor is formed by gate metallization of said field effect transistor, and another electrode of said capacitor is formed by a diffusion forming said one of the current flow electrodes of said field effect transistor.

5. The circuit of claim 4 additionally comprising a source of an input signal coupled to the gate electrode of said field effect transistor.

6. The circuit of claim 5 additionally comprising a second capacitor adapted to be connected to said other current flow electrode of said field effect transistor.

7. The circuit of claim 6 in which one electrode of of said second capacitor comprises said other current flow electrode of said field effect transistor, and a second electrode comprises a metallization layer insulated from said other current flow electrode.

* * * * *